United States Patent
Wang et al.

(10) Patent No.: US 8,132,398 B2
(45) Date of Patent: Mar. 13, 2012

(54) APPARATUS AND METHOD OF OPERATING A GAS TURBINE ENGINE AT START-UP

(75) Inventors: Yi Wang, Nottingham (GB); Paul David Rees, Derbyshire (GB)

(73) Assignee: Rolls-Royce PLC (GB)

( * ) Notice: Subject to any disclaimer, the term of this patent is extended or adjusted under 35 U.S.C. 154(b) by 935 days.

(21) Appl. No.: 12/053,739

(22) Filed: Mar. 24, 2008

(65) Prior Publication Data

US 2008/0250792 A1  Oct. 16, 2008

(30) Foreign Application Priority Data

Apr. 17, 2007  (GB) .................... 0707319.0

(51) Int. Cl.
*F02C 7/08* (2006.01)
(52) U.S. Cl. ..................... 60/39.281; 60/736
(58) Field of Classification Search ............. 60/39.08, 60/772, 39.281, 736; 137/563, 334–341
See application file for complete search history.

(56) References Cited

U.S. PATENT DOCUMENTS

| | | | | |
|---|---|---|---|---|
| 3,766,734 A * | 10/1973 | Jones | | 60/39.281 |
| 3,878,678 A * | 4/1975 | Huellmantel et al. | | 60/39.281 |
| 4,590,796 A * | 5/1986 | Baatz | | 73/114.42 |
| 4,741,152 A * | 5/1988 | Burr et al. | | 60/772 |
| 5,177,951 A | 1/1993 | Butler | | |
| 5,867,979 A * | 2/1999 | Newton et al. | | 60/226.1 |
| 6,298,833 B1 * | 10/2001 | Douville et al. | | 123/527 |
| 7,908,840 B2 * | 3/2011 | Schwarz et al. | | 60/39.08 |

* cited by examiner

*Primary Examiner* — Ehud Gartenberg
*Assistant Examiner* — Vikansha Dwivedi
(74) *Attorney, Agent, or Firm* — McCormick, Paulding & Huber LLP

(57) ABSTRACT

A method of operating a gas turbine engine having a turbine and a compressor connected via a shaft, a main fuel supply line for supplying fuel to a combustor that is positioned to release expanding hot gases to the turbine, the engine further including a starter/generator connected to the shaft via a gearbox assembly, the method is characterised the step of during engine start up fuel is circulated in a re-circulating fuel circuit positioned on the main fuel supply line and which has a first fuel/oil heat exchanger, for cooling the oil, and a fuel accumulator.

8 Claims, 2 Drawing Sheets

APPARATUS AND METHOD OF OPERATING A GAS TURBINE ENGINE AT START-UP

CROSS REFERENCE TO RELATED APPLICATION

This application is entitled to the benefit of British Patent Application No. GB 0707319.0 filed on Apr. 17, 2008.

FIELD OF THE INVENTION

The present invention relates to a method and apparatus for cooling a starter/generator of a gas turbine engine at start-up.

BACKGROUND OF THE INVENTION

One conventional means of starting a modern turbofan engine is via a compressed air starter where no dedicated cooling of such an air starter is required, as the heat rejection from such an air starter is low.

Another conventional method of starting more electric gas turbine engines is via an electric driven starter. Here the starter is a variable frequency starter/generator that has a built-in pump for pumping oil through the starter to a dedicated closed circulating oil cooling circuit to transfer the heat generated from the starter to the oil in the oil circuit. The heated oil is then cooled by a flow of fuel via a heat exchanger. The fuel is pumped to the heat exchanger and returned to a fuel tank housed within the aircraft (conventionally known as a fuel return to tank cooling system). This method relies on the fuel mass in the aircraft's fuel tank acting as an external thermal sink to remove heat from the VFSG oil circuit. Because there is a finite amount of fuel, this system is limited to the amount of heat that it can dissipate. In addition, there are problems in the fuel balance within aircraft fuel tanks and fuel tank contamination.

In principle, the thermal mass of the fluids and metals in the cooling circuits could be used as a simple static thermal sink, however, this method is of limited use due to the limited thermal capacity in the cooling circuits. Increasing the fuel volume in the loop would increase the thermal sink capacity, which means a large amount of fuel being stored on engine, and hence, adversely increases the weight of the engine and causes an unnecessary fire hazard for the engine.

Therefore it is an object of the present invention to provide an improved cooling system for the starter/generator that is not hazardous and is acceptable for engine certification requirements.

SUMMARY OF THE INVENTION

In accordance with the present invention there is provided a as turbine engine having a turbine and a compressor connected via a shaft, a main fuel supply line for supplying fuel to a combustor that is positioned to release expanding hot gases to the turbine, the engine further including a first fuel and oil heat exchanger associated with an engine starter / generator that is connected to the shaft via a gearbox assembly, the engine is characterised by a re-circulating fuel circuit positioned on the main fuel supply line that has a second fuel / oil heat exchanger and a fuel accumulator, the re-circulating fuel circuit cools the oil in the starter / generator via the first fuel and oil heat exchanger.

Preferably, the second fuel/oil heat exchanger is fluidly connected to an engine oil circuit.

Preferably, the first fuel/oil heater exchanger is fluidly connected to the starter/generator.

Preferably, the circuit comprises a fuel filter and which may be positioned between the second fuel/oil heat exchanger and the combustor.

Preferably, the circuit comprises a shut off valve that is provided to stop fuel return flow during normal engine running.

In another aspect of the present invention there is provided a method of operating a gas turbine engine comprising a turbine and a compressor connected via a shaft, a main fuel supply line for supplying fuel to a combustor that is positioned to release expanding hot gases to the turbine, the engine further comprises a starter/generator connected to the shaft via a gearbox assembly, the method is characterised the step of during engine start up fuel is circulated in a re-circulating fuel circuit positioned on the main fuel supply line and which comprises a first fuel/oil heat exchanger, for cooling the oil in the starter/generator oil circuit, and a fuel accumulator.

Preferably, a further step comprises supplying the cooled fuel to the starter/generator for cooling.

DETAILED DESCRIPTION OF THE PREFERRED EMBODIMENTS

Figure 1:
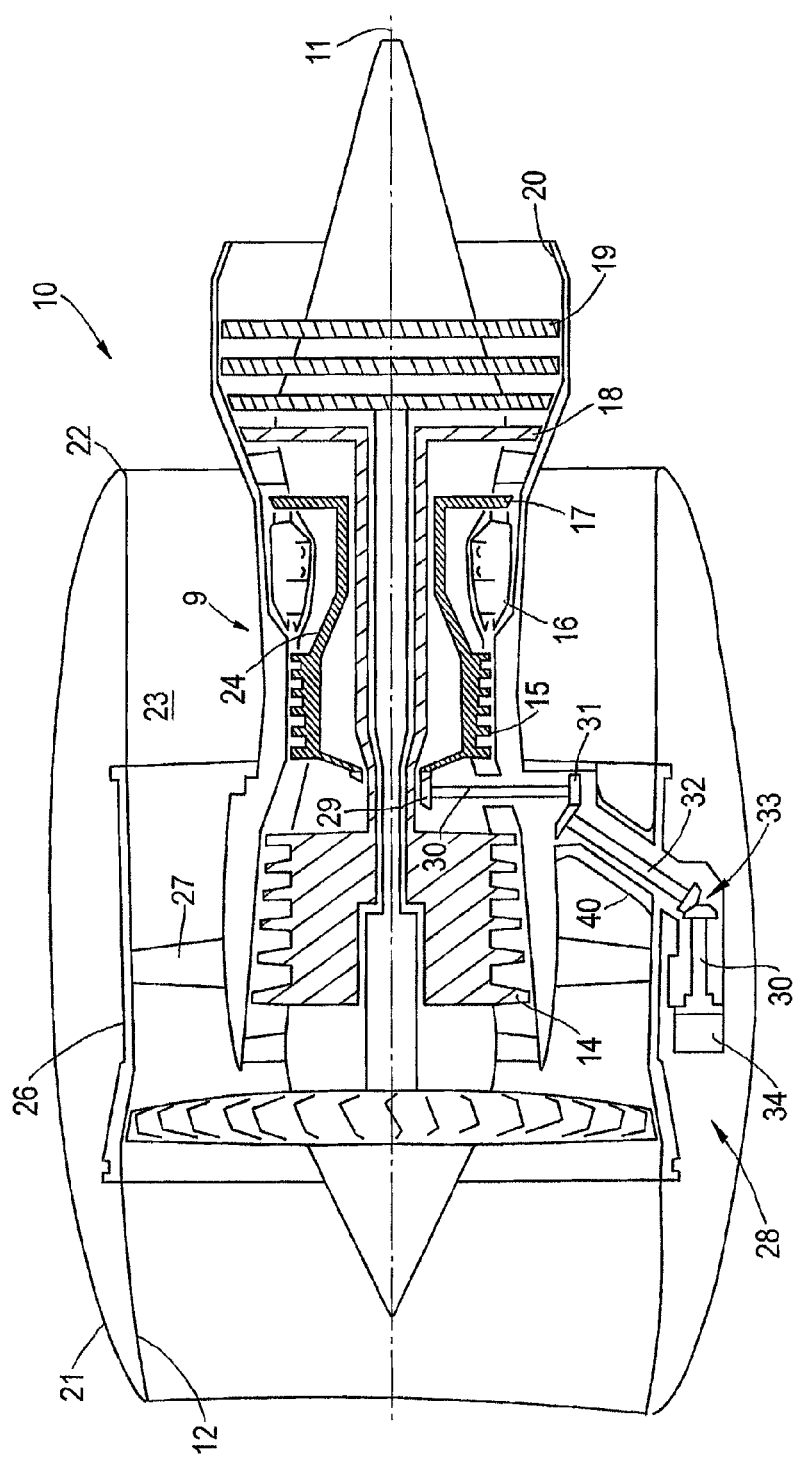
FIG. 1 is a schematic section of part of a ducted fan gas turbine engine incorporating the present invention.

FIG. 1 shows a ducted fan gas turbine engine generally indicated at 10 and comprising three main rotational shafts, however, the present invention is equally applicable to an engine having any number of shafts. This engine 10 has a principal and rotational axis 11. The engine 10 comprises a core engine 9 having, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and a core exhaust nozzle 20. A nacelle 21 generally surrounds the engine 10 and defines both the intake 12 and a bypass exhaust nozzle 22.

The gas turbine engine 10 works in the conventional manner so that air entering the intake 11 is accelerated by the fan 13 to produce two air flows: a first air flow into the intermediate pressure compressor 14 and a second air flow which passes through a bypass duct 23 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high, intermediate and low-pressure turbines 17, 18, 19 respectively drive the high and intermediate pressure compressors 15, 14 and the fan 13 by suitable interconnecting shafts.

The fan 13 is circumferentially surrounded by a structural member in the form of a fan casing 26, which is supported by an annular array of outlet guide vanes 27.

The engine 10 further comprises a gearbox/generator assembly 28 used for engine start up and for generating electricity once the engine has been started and working in convention fashion. The starter/generator is a variable frequency starter/generator (VFSG) as known in the art. The generated electricity is used for engine and associated aircraft electrical accessories as well known in the art. The gearbox/generator assembly 28 is drivingly connected to the high-pressure shaft 24, however, in other embodiments may be driven by any one or more of the shafts. In this embodiment, the gearbox/generator assembly 28 comprises an internal gearbox 29 connecting a first drive shaft 30 to the high-pressure shaft 24, an intermediate gearbox 31 connecting the first drive shaft 30 to a second drive shaft 32 and an external gearbox 33 drivingly connected to the second drive shaft 32. The external gearbox 33 is drivingly connected to a starter/generator 34 that is capable of the aforesaid engine operation. The starter/generator 34 and external gearbox 33 are housed within the nacelle 21, but may be positioned on the core engine, as opposed to the fan casing. The first drive shaft 30, intermediate gearbox 31 and the second drive shaft 32 are housed within a bypass duct splitter fairing 40.

Figure 2:
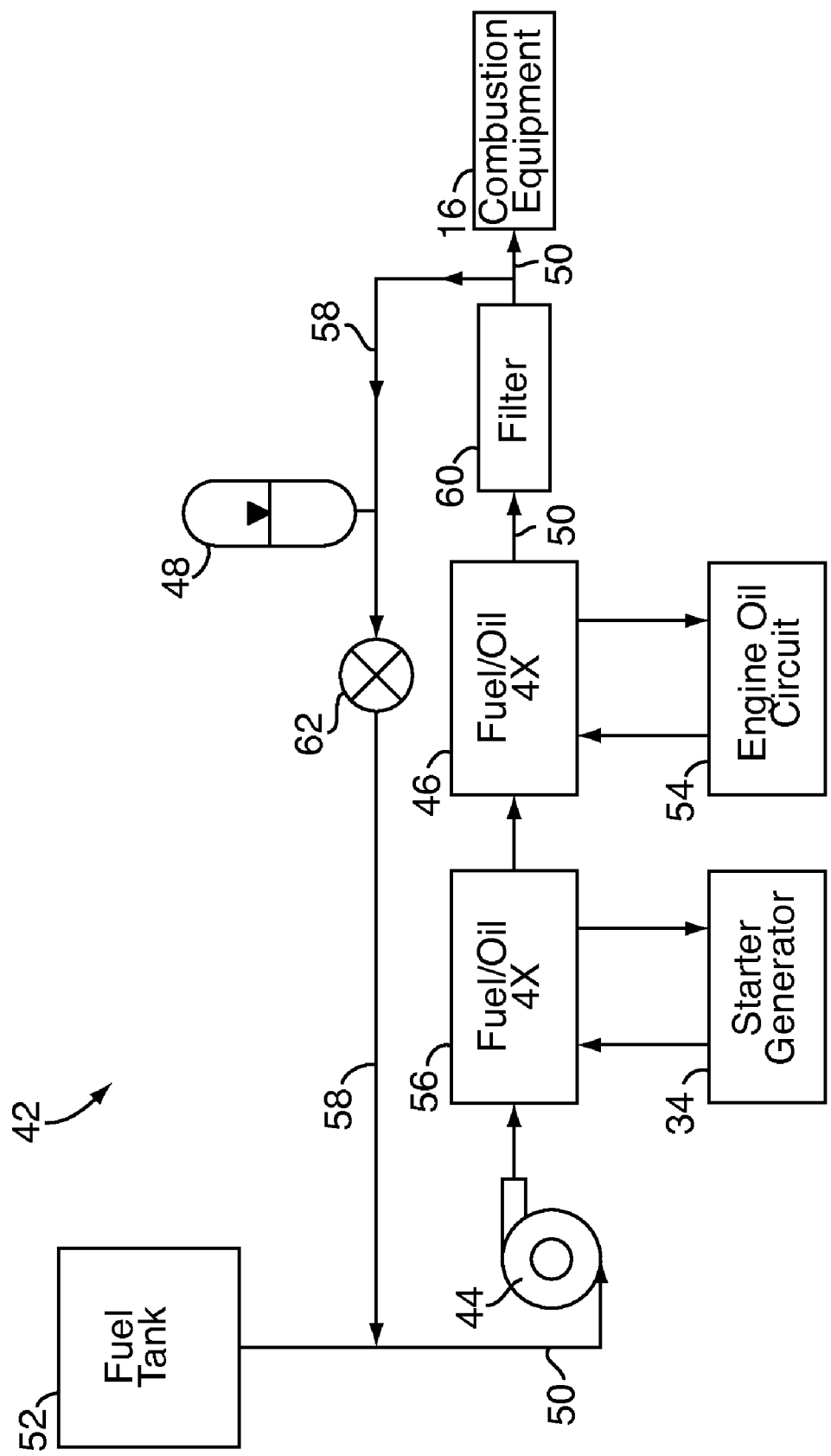
FIG. 2 is a schematic layout of a re-circulated fuel circuit used for cooling the engine's starter/generator.

Referring now to FIG. 2 the engine 10 further comprises a re-circulated fuel circuit 42 used for cooling the starter/generator 34. The re-circulated fuel circuit 42 comprises a pump 44, a first fuel and oil heat exchanger 56 (FOHE), a second fuel and oil heat exchanger 46 and a fuel accumulator 48. The recirculated fuel circuit 42 is situated on the main fuel line 50 between the main aircraft fuel tank 52, usually housed within the aircraft's fuselage or wing, and a fuel injector or the combustion equipment 16. Note that the recirculation fuel circuit 42 is part of the engine 10 and not the aircraft.

Inclusion of certain engine units in the fuel circuit is to increase the thermal capacity, e.g., the addition of a second FOHE 46 and filter 60.

The second FOHE 46 is fluidly connected to an engine oil circuit 54 and the first FOHE 56 is fluidly connected to a starter/generator 34. The oil in the starter circuit is self-contained; it is not connected to the engine oil system. A small oil sump (not shown) is provided in the starter/generator 34.

A filter 60 is positioned between the second FOHE 46 and the combustor 16. A shut off valve 62 is positioned downstream of the fuel accumulator 48 to stop fuel return flow during normal engine running.

In use, the circuit 42 re-circulates fuel via the pump 44, through the variable frequency starter/generator FOHE 56. The FOHE 56 dissipates heat from the VFSG 34, which is in contrast to the conventional practice of sending the fuel back to aircraft fuel tank 52.

The accumulator 48, situated on a fuel return line 58 is used to control the volume of fuel in the circuit 42 and increases the fuel's thermal capacity to remove the limitations of the conventional static thermal sink (i.e. the main fuel tank 52 in a conventional engine/aircraft). The accumulator 48 will be filled with fuel before or during the engine start. When the engine has successfully achieved a start, the fuel in the accumulator 48 will be emptied and sent back to the engine fuel line to be consumed by the engine combustor 16 during engine running. The accumulator could be a dedicated unit or a modified existing unit on engine, e.g., the fuel drain tank. A mechanical means or a modified existing unit on engine, such as the ejector pump in fuel drain tank, may be employed to change the effective volume of the accumulator 48. The mechanical means, such as a piston, may be powered by electrical, pneumatic or hydraulic devices or stored mechanical energy, such as a spring, could be used for this purpose.

Advantageously, the present invention removes the need of returning fuel back to aircraft fuel tank 52 during engine start up and hence there is no disturbance on fuel balance in aircraft's fuel tanks 52 and there are no fuel contamination issues.

Addition of the fuel accumulator 48 removes the limitation of the aircraft fuel tank as a static heat sink.

The accumulator 48 minimises the amount of fuel stored on engine 10. The accumulator is either evacuated by such means as an ejector pump, where the accumulated fuel is transferred into the main fuel lines and is consumed in the engine combustor or has its effective volume reduced mechanically to expel the contents into the fuel system, also to be consumed in the engine combustor.

What is claimed is:

1. A gas turbine engine comprising:
a turbine;
a compressor connected via a shaft to said turbine;
a main fuel supply line for supplying fuel;
a combustor for receiving said fuel that is positioned to release expanding hot gases to the turbine, a first fuel and oil heat exchanger associated with an engine starter/generator that is connected to the shaft via a gearbox assembly;
the engine is characterised by a re-circulating fuel circuit positioned on the main fuel supply line and that has a second fuel/oil heat exchanger and a fuel accumulator, the re-circulating fuel circuit thereby cooling the oil in the starter/generator via the first fuel and oil heat exchanger.

2. A gas turbine engine as claimed in claim 1 wherein the second fuel/oil heat exchanger is fluidly connected to an engine oil circuit.

3. A gas turbine engine as claimed in claim 1 wherein the first fuel/oil heater exchanger is fluidly connected to the starter/generator.

4. A gas turbine engine as claimed in claim 1 wherein the circuit comprises a fuel filter.

5. A gas turbine engine as claimed in claim 4 wherein fuel filter is positioned between the second fuel/oil heat exchanger and the combustor.

6. A gas turbine engine as claimed in claim 1 wherein the circuit comprises a shut off valve that is provided to stop fuel return flow during normal engine running.

7. A method of operating a gas turbine engine having a turbine and a compressor connected via a shaft, a main fuel supply line for supplying fuel to a combustor that is positioned to release expanding hot gases to the turbine, the engine further having a starter/generator connected to the shaft via a gearbox assembly, a first fuel/oil heat exchanger for cooling the oil in the starter/generator oil circuit, and a fuel accumulator, the method comprising the steps of:
initiating engine start-up;
circulating fuel in a re-circulating fuel circuit positioned on the main fuel supply line.

8. A method of operating a gas turbine engine as claimed in claim 7 wherein a further step comprises supplying the cooled fuel to the starter/generator for cooling.

* * * * *